United States Patent [19]

Zuehlsdorf

[11] Patent Number: 4,496,077
[45] Date of Patent: Jan. 29, 1985

[54] LEAK DETECTOR MONITOR FOR PRESSURIZED FLOW SYSTEMS

[75] Inventor: James J. Zuehlsdorf, Sussex, Wis.

[73] Assignee: Uni-Pump, Inc., Menomonee Falls, Wis.

[21] Appl. No.: 471,653

[22] Filed: Mar. 3, 1983

[51] Int. Cl.$^3$ .............................................. B67D 5/32
[52] U.S. Cl. .......................................... 222/61; 73/40
[58] Field of Search ................. 73/40, 40.5 R, 40.5 A; 137/458; 222/52, 61

[56] References Cited

U.S. PATENT DOCUMENTS 2,952,390  9/1960  Fowler et al. ........................... 73/40

Primary Examiner—Stanley H. Tollberg
Attorney, Agent, or Firm—Andrus, Sceales, Starke & Sawall

[57] ABSTRACT

A leak detector is connected in the main supply pipe from a gasoline storage tank to a plurality of retail gasoline pumps. A submersible motor-pump unit supplies gasoline through the pipe upon actuation of a nozzle switch at each pump. The detector, at turn-on, monitors the line pressure, and reduces flow if low line pressure indicates a system leak. Premature nozzle opening may simulate a leak and actuate the leak detector. A timed interlock switch in connected in series with the nozzle switch from the main power to related dispenser flow valves. The interlock switch includes a Triac in series with the power supply and main solenoids and a timing device including an integrated circuit having a pulsing network and a D.C. input connected in series with a rectifier to the power supply by the nozzle switch. The interlock switch has a fixed time period during which the respective flow valves are held closed such that an open nozzle does not simulate a leak. The switch is a small integrated switch unit mounted directly within each dispenser.

11 Claims, 3 Drawing Figures

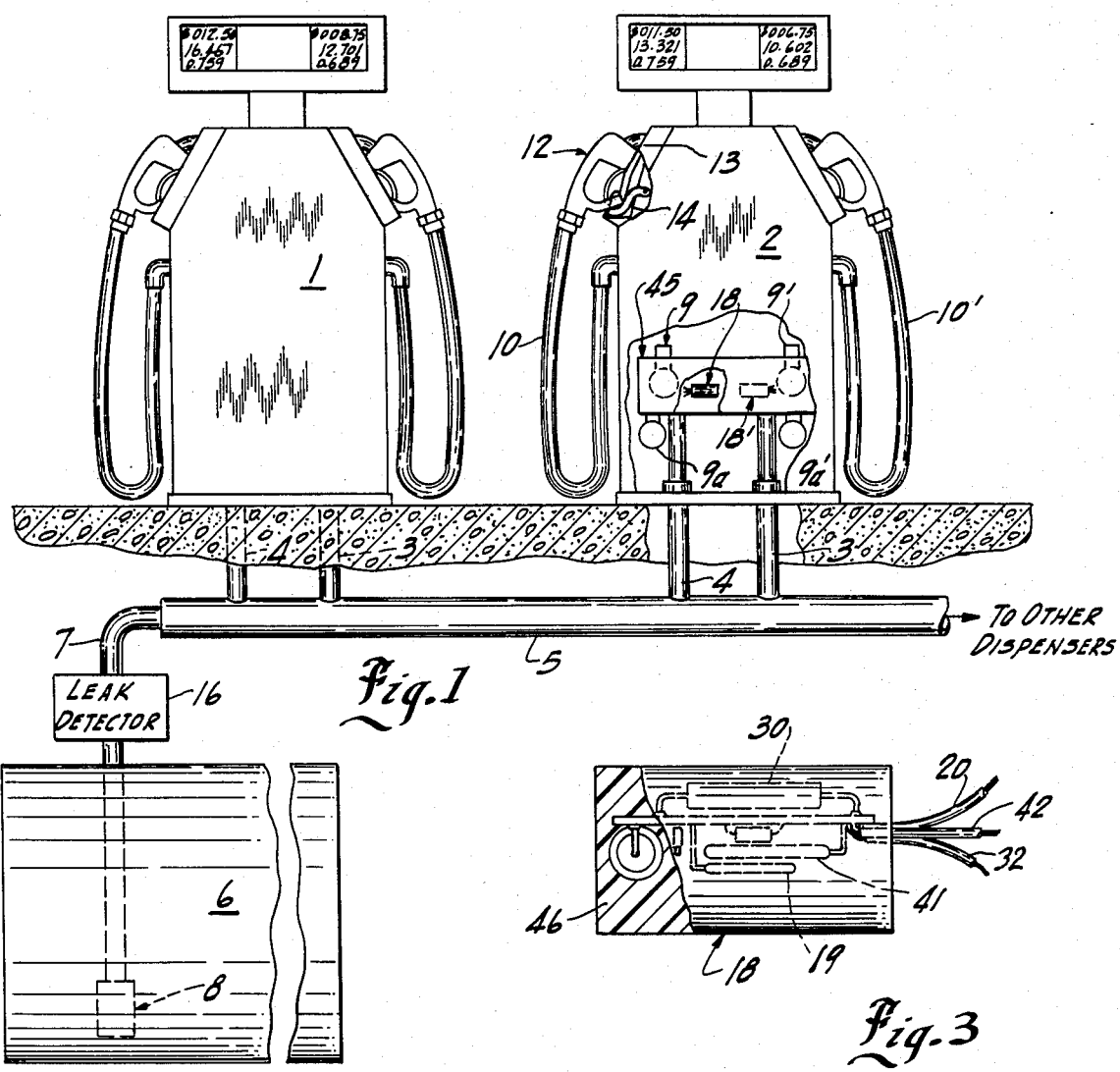
Fig. 1
Fig. 3
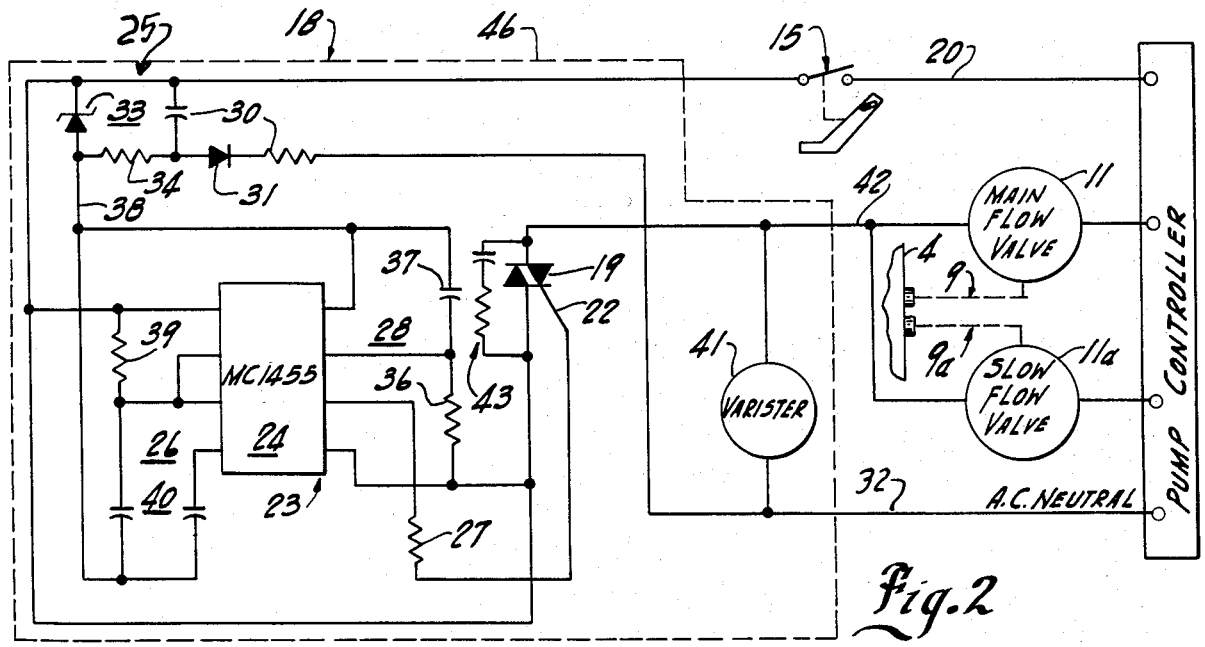
Fig. 2

LEAK DETECTOR MONITOR FOR PRESSURIZED FLOW SYSTEMS

BACKGROUND OF THE PRESENT INVENTION

The present invention is directed to a leak detector system for connection into a pressurized liquid flow system which is operated intermittently, and a leak detector system which is specially constructed to monitor the flow piping system for leakage upon each actuation and demand for delivery.

Retail gasoline dispensing stations include a central storage tank to which a plurality of gasoline dispenser are connected. The tank is provided with a single submersible motor-pump unit connected to a common discharge header and distribution pipe for delivery of gasoline to each of the dispensers which is connected to the distribution pipe by a branch pipe. Each dispenser is provided with a control valves and switching means for withdrawal of gasoline. Generally, the system includes a mechanically actuated switch which is manually operated by the purchaser or service station attendant. Actuation of the switch energizes the solenoid valve to open the line to the nozzle and energizes the submersible motor-pump to provide for delivery of gasoline from the dispenser. A plurality of dispensers can of course be simultaneously withdrawing gasoline from the common storage tank. Each pump is provided with the same similar controls. Generally, in such systems care must be taken to prevent leakage of gasoline from the distribution system. Thus, any leak in the system creates an extremely hazardous condition. Leakage is particularly great under pumping conditions when the pumps are pressurized. As the result code requirements generally include some requirement for a leak detection means incorporated into the flow system.

A well known and widely used detection system includes a pressure responsive detector connected to the immediate discharge side or discharge connection of the submersible pump or storage tank. The leak detector includes a pressure responsive control which compares the pump pressure with the line pressure. If the pressure in the distribution line does not rapidly rise to the output pressure of the pump, the leak detector automatically responds to prevent normal discharge. Generally, the leak detector operates to completely close the line to prevent withdrawl of gasoline or otherwise significantly reduces the flow. Otherwise, the leak detector unit permits the continued full flow and normal pressurized discharge. Although such systems are widely used and well known, it is also known that false actuation under apparent normal discharge operation may occur. Thus, in addition to actual leakage, other conditions may arise which simulate a leakage condition even though in fact a non-hazardous condition exists. For example, if the operator actuates the nozzle switch and rapidly opens the nozzle, a decrease in the pressure in the distribution line is created. The pressure responsive leak detector requires a certain time in which to operate. The rapid opening of the nozzle may result in the reduced pressure and thus in a condition simulating a leak prior to the completion of the leak detector cycle. The leak detector of course responds to maintain the fully closed or restricted flow condition. The operator must then completely recycle the system operation and, if he does not take care, may again create a simulated leakage condition. Such problems are particularly encountered during the winter months and particularly in geographical areas in which the air temperature is low while the ground temperature is relatively high. Thus, in the northern hemisphere it is not unusual to have the buried storage tank at ground temperature of approximately fifty degrees Fahrenheit. The distribution line is relative close to upper ground level, and the gasoline therein closely approximates the air temperature, which may well be zero degrees Fahrenheit or even colder. Under such a condition, the gasoline dispensed is at the fifty degree Fahrenheit. When the pump is shut down and the system turned off, the distribution line of course is filled with the higher temperature gasoline. Over a relatively short period of time, the gasoline cools and contracts due to the reduction in temperature from fifty degrees Fahrenheit to that of zero degrees Fahrenheit or essentially ground level temperature. Upon the next actuation of any dispensers on the distribution, the pump starts. However, the output of the pump must first fill the distribution pipe. During this period of course, the leak detector unit is monitoring the pressure deifferential and will continue to do so until the pump establishes full line pressure in the line. If the nozzle valve is opened prior to pressurization of the line, a leakage signal to the leak detector will be created. Other circumstances may also readily occur. Thus, if one introduces the nozzle into the receiving tank and opens the nozzle simultaneously with another person turning on the dispenser switch, the line will be opened and the leak detector will immediately be presented with the low pressure condition. In fact it has been found that the majority of, if not substantially all, complaints of such "nuisance tripping" is attributable to a too rapid opening of the discharge nozzle at the dispenser. Although in a full service station operation, the attendants might well be educated to properly operate the dispenser with the proper sequence, accidental malfunctions may still occur. Of course, in a self-service station such education is extremely difficult, if not impossible, and the nuisance tripping may be frequently encountered.

In retail gasoline dispensing systems, the dispensing hose may also have been drained by the user after the system has been shut down. Upon start up, the pump unit must again fill the hose system during the cycle time. Although this situation alone may not cause a false signal, the sequence does insert an additional delay in the build-up of pressure within the flow system, and may with other factors result in erroneous signaling of the leak.

Another difficulty which is encountered is that the various dispensers have different reset times. For example, certain pumps may have computer reset time which is longer than that normally encountered. This additional time is such that the nozzle may be opened before the proper time to allow the leak detector unit to cycle and once again giving a false indication.

Recognition of this problem has resulted in various proposed solutions including sensing means for monitoring of the leak detector operation on shut down of a pumping cycle. For example, U.S. Pat. No. 3,935,567 discloses a leak detection including a pressure responsive leak detector connected into the distribution line and having means for measuring the bleed-down rate of the system after a discharge cycle is completed. Thus, pumping pressure is normally on the order of twenty pounds per square inch, which is normally maintained for a period of time after closing of the nozzle(s). Any leakage in the system which is present will quite rapidly bleed off such pressure. As suggested in this U.S. Pat. No. 3,935,567, a pressure sensitive switch may be coupled to the circuit and provides an indication of either a leak or nonleak condition by monitoring the bleed off time of the line. A similar bleed down-time of a pressure responsive switch valve is suggested in U.S. Pat. No. 3,738,531 which issued June 12, 1973. In this system, the fluid pressure responsive switch valve in-line prevents the discharge until the fluid pressure in the line reaches a selected level. Alternatively, the inventor has suggested the use of a mechanically activated switch coupled to the leak detector valve. Thus, as in U.S. Pat. No. 3,935,567 the U.S. Pat. No. 3,738,531 suggests a control operative on shutdown in response to the position of the leak detector valve.

Other patents which similarly show leak detection on shut-down are shown in U.S. Pat. No. 3,188,127 which issued Jan. 29, 1974 and is assigned to Dresser Industries, Inc., as well as the related U.S. Pat. No. 4,131,216.

Although such leak detector apparatus is widely used and various leak detection monitor means have been suggested, the prior art generally requires rather complex control and pressure sensing systems and the like interconnected into the flow system. Therefore, a need exists for a simple but reliable leak detection monitor means which can be used with all of the several types of leak detector units and pumping systems including those requiring retrofitting.

SUMMARY OF THE PRESENT INVENTION

The present invention is particularly directed to a reliable and relatively inexpensive leak detection monitor and interlock control which is operable on start-up to permit normal anticipated usage of the dispenser without false actuation of the pressure responsive leak detector unit or the like. Generally, in accordance with the present invention, a timed interlock switch means is connected in circuit with the power supply from the main dispenser switch means to the dispenser discharge valve means. The switch unit preferably includes a Triac or other similar solid state interlock switch having a low signal control input. In start-up of the dispenser, a timing means is connected in circuit to a suitable power supply through the dispenser switch means and includes an output coupled to the input of the interlock switch. The timer delays the application of power to the interlock switch upon the closing of the dispenser switch and thereby holds the dispenser line closed for a predetermined timed period upon operation of the dispenser. The time period is selected to permit complete response of the interrelated leak detction means upon the initiation or start-up of the pump to locate any actual leakage in the system while maintaining proper full flow operation in the absence of actual leakage.

In a preferred construction, the gate of the "Triac" switch is connected to the output of a solid state timer which holds the switch off. The timer is connected to the A.C. power supply in series with a half-wave rectifier to provide a D.C. input to the timer. A Varistor is connected across the timing circuit between the main dispenser solenoid system and the A.C. neutral to protect the system against transient pulse conditions as the result of the inductive characteristic of the dispenser solenoid and the like. An R.C. Circuit is connected across the Triac to limit the rate of rise of the voltage across the Triac. The timer delays transfer power to the gate for the preset time period and thereafter maintains power to the gate essential to maintain the Triac in a conductive state, and connect the A.C. power supply to the main dispensing valve.

The timed interlock switch unit preferably includes a suitable integrated timer chip such as readily commercially available, and which may be readily packaged with a Triac for mounting in an explosion-proof box within the dispenser. The switch unit may be readily and conveniently connected into the system without change in the piping. Thus, the system of the invention is particularly adapted to construction and use with known technology and is particularly adapted to commercial implementation.

DESCRIPTION OF THE DRAWING FIGURES

The drawing furnished herewith illustrates a preferred construction of the present invention in which the above advantages and features are clearly disclosed as well as others which will be readily understood from the following description.

In the drawings:

FIG. 1 is a diagrammatic illustration of a retail service station including a plurality of dispensers interconnected to a gasoline storge tank;

FIG. 2 is a partial schematic circuit illustration of the power supply and pumping control system for the service station shown in FIG. 1 and illustrating an embodiment of the invention; and FIG. 3 is an elevational view of the leak detector monitor.

DESCRIPTION OF THE ILLUSTRATED EMBODIMENT

Referring to the drawings and particularly to FIG. 1, a conventional service station is partially illustrated including a plurality of similar gasoline dispensers 1 and 2, each of which is shown as dual unit. The several dispensers 1 and 2 are separately connected by connecting pipes 3 and 4 to a common header or distribution line 5 from a large gasoline storage tank 6 buried in the ground. The distribution line 5 is buried just beneath the ground level and connected to tank 6 by a connecting line 7. A submersible pump 8 is submerged within the tank and connected by an outlet header to the line 7. The submersible pump 8 functions to draw the gasoline from the storage tank 6 under pressure for pressurized discharge from any one or more of the dispensers 1 and 2 connected thereto in accordance with conventional practice.

Each dispenser 1 and 2 is similarly constructed and provided with pressure regulating valve meter drive means, filter and like components. A solenoid valve 9 and 9a are connected in parallel with the dispensing line to the flexible dispensing hose 10. The Valves 9 and 9a include solenoids 11 and 11a respectively which are energized to open the line connection to the hose 10. The valve 9 is a main flow valve providing full flow to the hose 10, while valve 9a is slow flow valve which is used on preset type dispensers. Thus, the controls for valve 9 and 9a include means to sense a discharge approaching a preset amount and to then close valve 9 and subsequently close valve 9a at the precise preset amount. The hose 10 terminates in a nozzle 12 having the usual manually actuated nozzle valve, not shown. The nozzle is supported in a recessed support bracket 13. The bottom wall of bracket 13 is a pivoted arm 14 which is coupled to actuate a control switch 15 shown in FIG. 2. Thus each of the dispensers is any suitable or known dispenser of a suitable or desired construction. The dispensers are shown as a dual product dispenser having a pair of hoses 10 and 10' connected to separate metering assemblies which are coupled to the distribution line by the tapped line connections 3 or 4. The nozzles 12 and 12' at the end of the hoses are similarly housed in the suitable recess compartment in the opposite sides of the dispenser. The switch lever 14 in the base of the compartment cannot be raised until the nozzle is removed because it forms a part of the mechanical support for the nozzle in the stored position. When the lever 14 is pivoted upwardly, it operates a switch actuator which functions to close dispenser power contacts 15 to supply power for energizing the submersible pump unit 8, as well as the dispensing solenoid valve 11. The switch actuator may be of any known or suitable construction. Older units may have a direct coupling to mechanically operate a switch 15, while more recent units may use an electrical reset driving a cam to actuate a switch or an electronic control having a relay switch unit including contacts 15.

A leak detector valve unit 16 of any suitable construction is connected in the line closely adjacent to the discharge side of the pump 8. The leak detector valve 16 may be of the construction shown and described in the above described prior art patent. A particular suitable leak detector unit is manufactured and sold by Red Jacket Pumps. The latter unit has a diaphragm actuator, not shown, responsive to the differential pressure in the distribution line 7 and the output of the submersible pump unit 8. If the pressure in the distribution piping drops to 4 PSI units or less, the leak detector unit 16 trips to a restricted flow position and limits flow to a latched approximately one and one half gallons per minute. Such a reduced flow of course is an instantaneous indication to the operator of an abnormal condition and particularly that a leak exists in the system. The leak detector unit 16 has a response time which varies somewhat with the system but is normally on the order of two to two and one half seconds. Assuming normal operation and the absence of leakage, the leak detector valve of course remains open at the end of such timing cycle and maintains full flow and pressure within the distribution system to all dispensers 1 and 2.

Thus, when the submersible motor-pump unit 8 is in operation, the distribution line 5 is pressurized and gasoline flows through the system to the individual solenoid valve 9 associated only with that dispenser 2. The flow through the leak detector 16 is monitored to determine the line pressure relative to the pump pressure. If the line pressure is below the preselected level, which will normally only be in the presence of a leak or some condition which simulates a leak, it will maintain a closed or semi-closed position.

In accordance with the present invention, an interlock timed switch unit 18 is mounted with each dispenser for each hose and is connected in circuit to the operating controller 19, such as shown in FIG. 2, in series with the dispenser switch 15. The timed switch unit 18 is constructed and connected in accordance with the teaching of this invention to effectively maintain the circuit to the solenoid valve 9 open for a predetermined fixed period of sufficient length to allow the leak detector to complete its cycle. Thus, when the operator actuates the dispenser switch lever 14, power is not instantaneously applied to the solenoid valve 9. Therefore, even though the operator may open the nozzle 12, gasoline is not instantaneously dispensed, and more importantly the open nozzle valve does not open the distribution system in a manner to reduce the line pressure during the period the leak detector is cycling. After the preset timing period, the timed interlock switch unit 18 closes and power is now provided to the main solenoid valve 9 in the dispenser 2 for the hose 12. The valve 9 opens and the system now operates to pump gasoline from the nozzle 12 in the usual manner. Assuming the leak detector unit 16 has not operated to restrict the flow, a full flow condition exists, and the operator can be assured that the system is free of any leak. If the leak detector detected a leak, the slow flow state results.

The present invention is particularly directed to the leak detector monitor 18 which functions on startup of the dispenser and may be applied to any conventional or other desired pumping system having manually initiated main on-off switch means. The known system components are not therefore described further herein other than as necessary to fully and clearly describe the illustrated embodiment of the invention.

Referring particularly to FIG. 2, the timed interlock switch unit 18 is shown in a preferred construction. The switch unit 18 includes a solid state gated switch 19 particularly shown as a well known Triac. The Triac switch 19 has a pair of main terminals, one side of which is connected to the A.C. power supply 20 in series with the dispenser switch 15. The opposite side or terminal of the Triac is connected to the dispenser solenoid 11 of valve 9 in parallel with a slow flow valve. Thus, the A.C. circuit to the solenoid valve 9 is therefore open until such time as both the dispenser switch 15 and the gated switch 19 is turned on. The gated switch 19 has an input gate 22 connected to the output of a timer 23, which in turn is connected to be activated by closing of the dispenser switch 15.

The timer 23 is shown including a known 555 type integrated circuit timer chip 24, such as manufactured and sold by Motorola Corporation under the number MC1455 PI. Texas instrument manufactures and sells a similar operational chip under the model TI-NE 555P chip. In accordance with known constructions, such a timer chip 23 is adapted to be driven from a D.C. supply 25 with the timing period controlled by the external connection of an RC network 26.

The output of the chip is connected by a current limit resistor 27 to the gate terminal 32 of the Triac 19. A pulse forming network 28 is connected to the output circuit to provide a high driving pulse to the gate circuit of the Triac 19.

The D.C. power supply 25 is shown as a Zener diode regulated supply including an R.C. network 30 and a series diode 31 connected from supply 20 via switch 15 to the A.C. neutral 32. A Zener 33 is connected across the capacitor in series with a resistor 34 and the D.C. signal is taken from the junction of the Zener and the resistor to provide a D.C. input signal to the timing circuit.

The pulse forming circuit 28 includes a series R.C. branch 35 including a resistor 36 and a capacitor 37 connected to the time chip 24 and the Triac 19. The pulse forming circuit 28 momentarily (about one usec) holds the gate signal low but rapidly rises to hold the Triac 19 off as the result of short R.C. time constant. The timing network 26 includes a resistor 39 and capacitor 40 connected in series to the D.C. power supply line 38 and to the timer chip 24 in a conventional circuit connection. The timer is reset by the momentary response of the pulse forming network. The timer 24 circuit then begins its timing cycle, which is set to be approximately two seconds, and times out, thereby releasing the output signal which drops and gates the Triac on. The illustrated timer means will be recognized as a known circuit which may be replaced with any other similar or suitable time means, and no further description is given other than as necessary to fully and explicitly describe the invention. Thus, the timer means should provide a signal which releasably drives the Triac 19, or other solid state switch, wholly on or wholly off and also be selected for direct mounting within a gasoline dispensing pump.

A Varistor 41 is connected from the A.C. neutral to the common connection line 42 between the Triac 19 and the the solenoid of the flow valve 9. The solenoid 11 in the main flow line 4 introduces an inductive load in the circuit which can introduce high voltage transients. The Varistor clamps the voltage on the controller line and prevents creation of the undesirable high voltage transients in the system.

An R.C. network 43 is preferably connected across the Triac switch to limit the DV/DT signals applied across its main terminals and thereby protect the switch.

In operation of the dispenser 1, 2 or any other coupled to line 5, the operator removes the nozzle 12 and actuates lever 14 to close main switch 15, and thereby start the submersible motor. Simultaneously, power is supplied to the timer unit 23 to control the signal to gate 22 of switch 19. The timer unit 23 begins to affect a timing operation, during which the timer unit 23 positively holds Triac switch 19 off. After the predetermined period as determined by the time constant of the R.C. network 26 and of sufficient length to permit the leak detector unit 16 to function, the time unit times out and generates the turn-on signal to gate 22 and drives the Triac to conduct as long as the signal appears at the gate. If the leak detector operation has found the system to be without any leakage, the opening of main and slow flow valves 9 provide full flow to the nozzle. The sequence of opening valves 9 and 9a may vary with the manufacturer of the dispenser or the electronic control, but is not significant to this invention and no further description thereof is included. If the leak detector unit 16 found a leak in the system, valves 9 and 9a may open but the leak detector 16 includes a restricted flow passage which reduces the flow such as to three gallon a minute in accordance with known detector construction. This extremely slow dispensing of the gasoline will be directly apparent to the user who will report the same to the operator, or the operator will directly note the slow discharge through the readout or the like. In practice, the timer unit 18 has been found operative between 1.2 to 2.5 seconds, but is preferably about 1.8 to 2 seconds for convenient use of the dispenser while maintaining reliable, repeatable operation of the leak detector unit 16.

The leak detector unit 16 is monitored in essence at the initiation of each dispensing cycle. The operator however actuates the mechanism in the normal manner and the short time delay is insufficient to be noticeable in the usual system operation. Further, the pump may be labeled to notice that the pumping begins normally momentarily after the nozzle 12 has been placed in the tank and the nozzle 12 opened.

The solid state switch unit 19 and interrelated timer 18 is particularly adapted to a conventional circuit board construction. Such an integrated unit is readily adapted to be mounted in a conventional explosion proof box 45, which is a common part of gasoline dispensers 1 and 2 within existing code requirements. In addition, the solid state switch unit 19 and interrelated timer are also potted in an encapsulating resin 46 which seals the circuit and components from the surrounding environment (FIG. 3).

The invention thus is particularly adapted to relatively inexpensive mass production such as required for use in the retail dispensing field.

A separate timing unit is connected for each dispenser hose 10 and monitors the leak detector unit at each start up of the system. Thus, if another dispenser is in operation, the leak detector is not recycled and the system continues to operate. Such redundancy is readily acceptable because of the low cost modification required to new and existing pumps with the present invention.

The present invention is directly applicable to all of the various forms of dispensers presently available and used in the field, including the most recent computer based dispensers. Thus, in the present invention the interlock is connected directly into the main power line to the operating control valves and would not effect any of the electronic control circuit or systems of such recent dispensers.

Various modes in carrying out the invention are contemplated as being within the scope of the following claims particularly pointing out and distinctly claiming the subject matter which is regarded as the invention.

I claim:

1. A fluid flow system having a pump means for withdrawing of fluid from a storage tank and supplying such fluid through a main distribution line to at least one individual dispenser under pressure and wherein said supply line pressure can vary over a range between a low pressure in the presence of a leak in the system and a significantly higher delivery pressure in the absence of said leaks and wherein said supply line pressure is subject to variations upon initial operation of said pump means simulating a leak condition, leak detector valve means connected to said supply line and responsive to the differential pressure between the supply line pressure and the delivery pressure from said storage tank to prevent free flow from the storage tank to the supply line, the improvement in a leak detector monitor comprising an individual flow control means having an electrical operator one each for each of said dispensers, a control switch means operable to provide power to said pump means and to said individual flow control means within the corresponding dispenser, each of said dispensers including an interlock means including an interlock switch connected in series between said control switch means and said individual flow control means to prevent operation of said flow control means during the initial operation of said pump means, and timing means connected in circuit through said control switch means and having an output connected to said interlock switch means, said timing means being responsive to closing of said control switch means to generate a turn-on signal to said interlock switch means only a predetermined time after the closing of said control switch means.

2. The system of claim 1 wherein said interlock switch means is a gated switch means having main power terminals connected in series with said control switch means, said gated switch means having a gate controlling conduction through the gated switch means, said timing means being a solid state integrated circuit including an R.C. network for controlling the time constant of the timing means and having a D.C. signal input, and a rectifying network interconnected between said input and the switched A.C. line to provide a D.C. signal to said timing means in response to the closing of said control switch.

3. The system of claim 1 including a Varistor interconnected between the output side of said solid state gated switch means and the return side of the power supply.

4. The system of claim 3 wherein an R.C. network is connected across the solid state switch means.

5. A fluid flow system having a pump means for withdrawing of fluid from a storage tank and supplying such fluid through a main distribution line to at least one individual dispenser under pressure and wherein said supply line pressure can vary over a range between a low delivery pressure in the presence of a leak in the system and a significantly higher delivery pressure in the absence of said leaks and wherein said supply line pressure is subject to variations upon initial operation of said pump means simulating a leak condition, leak detector valve means connecting said supply line and responsive to an abnormal pressure condition between the pump means and the dispenser from said storage tank to prevent free flow from the storage tank to the supply line, the improvement in a leak detection monitor comprising a control means connected to prevent opening of the discharge line from said dispenser, a timing means operable in response to enabling said dispenser and actuating said control means after a predetermined time to open said discharge line from said dispenser.

6. The flow system of claim 5 wherein said control means is an interlock switch, and said timing means is coupled to said interlock switch to close the switch only after said predetermined time.

7. The flow system of claim 5 wherein said dispenser includes a control switch, and said control means is a solid state gated switch connected in series with the control switch and having an input means, said timing means including a solid state timer circuit means, an explosion proof housing, means mounting said gated switch and said solid state timer circuit in said explosion proof housing, and means mounting said explosion proof housing within the dispenser.

8. The flow system of claim 5 wherein said timing means includes an encapulating outer shell.

9. The flow system of claim 7 wherein said solid state timer circuit includes an integrated circuit unit having external R.C. timing network to set said predetermined time and an external R.C. pulse network to generate a sharp changing signal to the solid state switch.

10. The flow system of claim 7 wherein said flow control means is a solenoid valve having a coil connected in series with said control switch means and said gated switch, and including a Varistor connecting the connection of the gated switch to electrical neutral to suppress transient signals associated with said solenoid valve.

11. A retail gasoline dispensing system for dispensing of fuel through a buried storage tank and having a main distribution line within the ground interconnected to a plurality of individual dispenser, each of which dispensers includes a control switch connected to a power supply for actuating of a common submersible pump for withdrawing of fuel from said tank and for actuating of interlocking electrically actuated control valves within a particular dispenser, and said system having a leak detector valve means in said distribution line adjacent the storage tank having a predetermined operating period and operable to prevent full flow of fuel from the tank to the distribution line, the improvement in a leak detector monitor apparatus comprising a normally open control switch connected in series with said dispenser switch, a timing means connected to said power supply to the power side of said control switch and having an output means coupled to actuate said interlock switch, said timing means being operable in response to the closing of said control switch to initiate a timing cycle during which said interlock switch is held close, said timing means having a predetermined time period related to the cycle time of said leak detector means and closing said interlock switch at the end of its time period to thereby provide power to said dispenser valve means.

* * * * *

UNITED STATES PATENT AND TRADEMARK OFFICE
CERTIFICATE OF CORRECTION

PATENT NO. : 4,496,077
DATED : January 29, 1985
INVENTOR(S) : JAMES J. ZUEHLSDORF It is certified that error appears in the above-identified patent and that said Letters Patent are hereby corrected as shown below:

Abstract, line 9, after "switch" delete "in" and substitute therefore ---is---; Col. 1, line 47, delete "withdrawl" and substitute therefore ---withdrawal---; Col. 2, line 21, delete "deifferential" and substitute therefore ---differential---; Col. 3, line 52, delete "detction" and substitute therefore ---detection---; Col. 3, line 60, delete "Varistor" and substitute therefore ---varistor---; Col. 3, line 65, delete "R.C. Circuit" and substitute therefore ---A.C. circuit---; Col. 4, line 24, delete "storge" and substitute therefore ---valves---; Col. 4, line 58, after "is" insert ---a---.

Signed and Sealed this

Twenty-second Day of October 1985

[SEAL]

Attest:

DONALD J. QUIGG

Attesting Officer

Commissioner of Patents and
Trademarks—Designate